United States Patent [19]

Weber et al.

[11] 4,354,903
[45] Oct. 19, 1982

[54] PROCESS FOR DRYING AND PREHEATING COAL UTILIZING HEAT IN DRY COOLING OR QUENCHING OF COKE

[75] Inventors: Heinrich Weber, Recklinghausen; Kurt Lorenz, Hattingen; Horst Dungs, Herne, all of Fed. Rep. of Germany

[73] Assignee: Firma Carl Still GmbH & Co. KG, Fed. Rep. of Germany

[21] Appl. No.: 249,155

[22] Filed: Mar. 30, 1981

[30] Foreign Application Priority Data

Apr. 5, 1980 [DE] Fed. Rep. of Germany ....... 3013325

[51] Int. Cl.³ .................... C10B 39/02; C10B 45/00
[52] U.S. Cl. ........................................ 201/6; 201/39; 201/41; 201/43; 202/228
[58] Field of Search .................... 201/6, 39, 41, 43; 202/95, 253, 227, 228; 34/10, 19, 27, 31, 35

[56] References Cited

U.S. PATENT DOCUMENTS

| 3,728,230 | 4/1973 | Kemmetmueller | 202/228 |
| 3,800,427 | 4/1974 | Kemmetmueller | 202/227 |
| 3,843,458 | 10/1974 | Kemmetmueller | 201/39 |
| 3,888,742 | 6/1975 | Kemmetmueller | 202/228 |
| 4,053,364 | 10/1977 | Poersch et al. | 201/39 |
| 4,287,023 | 9/1981 | Cooper | 202/228 |

OTHER PUBLICATIONS

Betz Handbook of Industrial Water Conditioning; 7th Ed.; 1976; pp. 81-85.

*Primary Examiner*—Bradley Garris
*Attorney, Agent, or Firm*—McGlew and Tuttle

[57] ABSTRACT

A three-cycle process as disclosed for drying and preheating coking coal using the heat from cooled coke. Cooling gas is passed over hot coke to heat the cooling gas and cool the coke. The heated cooling gas is then passed through a waste heat boiler and then back to the hot coke in a coke cooling chamber. This completes the first closed cycle. Water is supplied to the waste heat boiler to form steam. The steam is supplied to a fluidized bed of wet coal to indirectly preheat and dry the wet coal in a second cycle. The wet coal is fluidized using fluidizing gas which converts water in the wet coal into steam. Some of the steam is condensed from the combination of fluidizing gas plus steam and then the fluidizing gas is returned to the bed. Steam from the waste heat boiler is also supplied to the fluidizing gas before it re-enters the bed to heat the fluidizing gas.

6 Claims, 3 Drawing Figures

PROCESS FOR DRYING AND PREHEATING COAL UTILIZING HEAT IN DRY COOLING OR QUENCHING OF COKE

FIELD AND BACKGROUND OF THE INVENTION

The invention relates to a process for drying and preheating coal by utilizing the sensible coke heat in the dry cooling or quenching of coke in a three-cycle system, where the coke heat is transferred, in a first gas cycle, directly to a cooling gas (inert gas), and is then indirectly reacted completely to steam, and where the heat energy of this steam passes over, in a second steam cycle, to the coal, and where the coal is fluidized in a third cycle by means of steam or inert gas.

The term "three-cycle system" for such processes, has been generally accepted in the industry. It is known to use the sensible coke heat for generating steam (DAS No. 2,738,442) in the dry cooling of coke.

A coal drying process is also known where the coal particles to be dried are suspended in a fluid bed in a drying chamber, and the coal particles are dried in the chamber by means of heating coils to which steam is supplied, and the steam is heated in the heating coils by a heat exchanger. The heat for the heat exchanger is taken from the coke oven cooling gas which is used in the dry cooling of coke from a coke oven. The gas used for the fluid bed can be heated by the heat exchanger, from which heat is withdrawn from the steam in the heating coils. The gas for the fluid bed is a part of the steam which is heated in the heat exchanger and fed to the heating coils, so that the same steam is used for the fluid bed and for the heating coils (DOS No. 2,342,184).

These methods are most economical when the heat-absorbing and heat-emitting media are circulated in a complete cycle, and single or several gas cycles have already been realized in the known methods. In the method according to DOS No. 2,342,184, the coke heat is first given off in a completely closed inert gas cycle to a gas, and transferred indirectly to water for the preparation of steam. The steam transfers its heat energy in a second cycle by indirect contact with the coal particles to be dried, and the returns to the coke heat transfer device for resuperheating. Steam, which can likewise originate from the coke heat, can be used as a fluidizing medium for the fine coal to be dried, and coked in a drying vessel. This is not done in a cycle, however, which returns to absorb coke heat, but in an open system where the steam is lost. A cycle only takes place over the drying vessel.

In addition, this process is carried out at a temperature at which sulfur compounds are released from the coal to be dried, which could not be left in the circulating steam. Consequently, it is necessary to treat the steam and to condense it. Though the condensate can be treated together with the condensates of the coke oven gas, this requires additional installations for the preliminary coke drying plant which burden the entire system. In addition, desulfurizing agents are added to the dried fine coal which must be removed again after drying. This interlocking of preliminary coal drying and desulfurization is economically unfeasible and requires a considerable amount of equipment. Furthermore, the steam which has come in direct contact with the coal cannot be returned into the coal drying plant, and is therefore lost. The process according to DOS No. 2,342,184 is therefore not a three-cycle process, but a two-cycle process. A return of the direct drying steam into the total steam cycle system and reprocessing of the coke heat is not provided.

From DOS No. 2,647,079, it is known to effect the predrying and the preheating of the coal, exclusively in a recycled indirectly superheated steam atmosphere, and to withdraw the portion originating from the wet coal from the steam cycle. The coke quenching heat for predrying is taken from the coal in such a way that the coal predrying gas cycle is combined with the coke quenching gas cycle according to DOS No. 2,415,758 into a single cycle. In the drying method according to DOS No. 2,647,079, considerable quantities of gas or superheated steam must be recycled and separated from the coal by cyclones, since the heat is transferred directly to the coal, exclusively.

Not all gas cycles are closed in all known methods. There are large quantities of gas that have to be treated with the resulting technical and commercial expenditures.

SUMMARY OF THE INVENTION

The problem underlying the invention is to carry out the above defined process in a temperature range in which no desulfurization of the coal yet takes place, and in such a way that the amounts of gas to be treated remain much lower than in the known methods.

For the solution of this problem, it is suggested to carry out the three-cycle process for drying and preheating coking coal, in a temperature range of 90° to 250° C. in such a way that the third cycle is likewise operated as a closed cycle, and the circulating gas for this cycle is heated with steam taken from the second cycle.

In the process according to the invention, the coke heat can be utilized to a great extent, because three completely closed gas cycles are formed.

As a result of this procedure, certain installations (dust arrestor, blower, and heater) can be kept small, so that the investment costs of the plant, as well as the power consumption for the blowers can be reduced.

The suggested process is particularly advantageous if only steam is used in the third cycle as a gas for the direct predrying of coal, where the moisture withdrawn from the coal is removed from the cycle as steam and then condensed. The discharged steam contains no harmful substances and can be used as steam condensate or soft water.

A particularly economical procedure with a low consumption of steam, cooling water and inert gas is achieved, because the energy required for the wet evaporation and for heating of the coal is supplied to the product indirectly by heat transfer over exchange tubes, and to a lesser extent by cooling of the fluidizing medium, and because it is not necessary to cool the entire amount of fluidizing gas to remove the water released during the drying process from the steam cycle. Only the evaporated water is withdrawn from the coal, plus the leaking air introduced with the wet coal and cooled in the condenser to about 40° C., and continuous addition of inert gas is not necessary.

Inert gas can also be used as a fluidizing medium instead of steam. Here, too, water is released during the drying process from the coal in the form of steam and discharged at the head of the drier together with the fluidizing medium. In contrast to the steam cycle, however, the entire amount of inert gas must be cooled to about 40° C., to remove the water evaporated from the coal, from the cycle. Due to the leaking air introduced with the coal charge, the $O_2$-content in the inert gas cycle would be decreased in the course of time. In order not to exceed a certain $O_2$-content in the inert gas cycle, a small amount of inert gas must therefore be supplied continuously to the recycle gas.

It was found particularly advantageous for the design of the waste heat boiler in the first gas cycle, in which the coke heat from the cooling gas is indirectly converted completely to steam, to use a vacuum-deaerated boiler feed water at about 50° C. In connection with the coke dry cooling plant, the use of the vacuum-deaerated boiler feed water of about 50° C. has the following advantages:

(a) Low cooling gas temperatures at the outlet of the waste heat boiler and thus sufficiently low cold coke temperatures in the cooling shaft.

(b) Small feed water preheater and evaporator heating surfaces in the waste heat-boiler, and thus lower investment costs.

(c) Small heating surfaces lead to a reduction of the pressure loss on the cooling gas side.

(d) The additional costs of vacuum deaeration compared to pressure deaeration (110° C.) of boiler feed water are so small that the advantage of the lower investment costs according to advantage (b) is fully realized.

(e) Vacuum deaeration at about 50° C. is particularly economical in connection with the coking operation, since the energy required in the deaerator to heat the feed water to about 50° C. and for partial evaporation is available in excess in the form of hot water (e.g. $NH_3$-water).

In the operation of a coke oven battery it happens frequently that a break-down occurs for some reason, so that the coke production is temporarily reduced. As a result, the generator of steam is likewise reduced, and there is not enough steam available for predrying the coal and for the other loads. In order to ensure a uniform generation of steam from the coke heat in the first gas cycle, the invention suggests an increase in temperature of the inert gas originating from the cooling of the coke by adding hot combustion gases, even with a reduced coke production. This can be done, e.g. by installing a burner in this gas cycle ahead of the inlet into the steam boiler, which is operated with coke oven gas or undergrate gas. In this way, the heat supply of the cooling gas is kept constant, and the amount of steam obtained remains likewise constant.

In order to further increase economy, it is suggested to mix the coke dust deposited from the coke cooling cycle with the coke dust deposited from the coal drying cycle, and to add a binder to the mixture. When this bonded mixture is subsequently briquetted together with dry and preheated coal, there is no loss of coal substance in the total process. 100% utilization for the coking process is, in this way, obtained.

The combination of coal drying in the fluid bed with dry coke cooling is particularly economical, because about 85 to 87% of the total heat to be expended in coal drying can be introduced indirectly over steam.

Accordingly, an object of the present invention is to provide a process for drying and preheating coking coal using heat from coke to be cooled comprising, passing a cooling gas over hot coke in a coke cooling chamber to cool the coke and heat the cooling gas, recycling the heated cooling gas through a waste heat boiler and back to the coke cooling chamber to form a first closed cycle, supplying water to the waste heat boiler to form steam by heating the water indirectly with the heated cooling gas, feeding steam formed in the waste heat boiler to a fluidized bed of wet coal to indirectly preheat and dry the wet coal in a second cycle, fluidizing the wet coal using a fluidizing gas supplied to the bed indirectly of the steam fed to the bed for preheating and drying wet coal, the fluidizing gas converting water in the wet coal into steam, feeding the fluidizing gas plus steam converted by the fluidizing gas from the bed, condensing at least some of the steam converted by the fluidizing bed, returning the fluidizing gas less the at least some condensed steam to the bed in a third closed cycle, and indirectly heating the fluidizing gas returning to the bed with steam from the waste heat boiler in a heater, before the fluidizing gas is returned to the bed.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
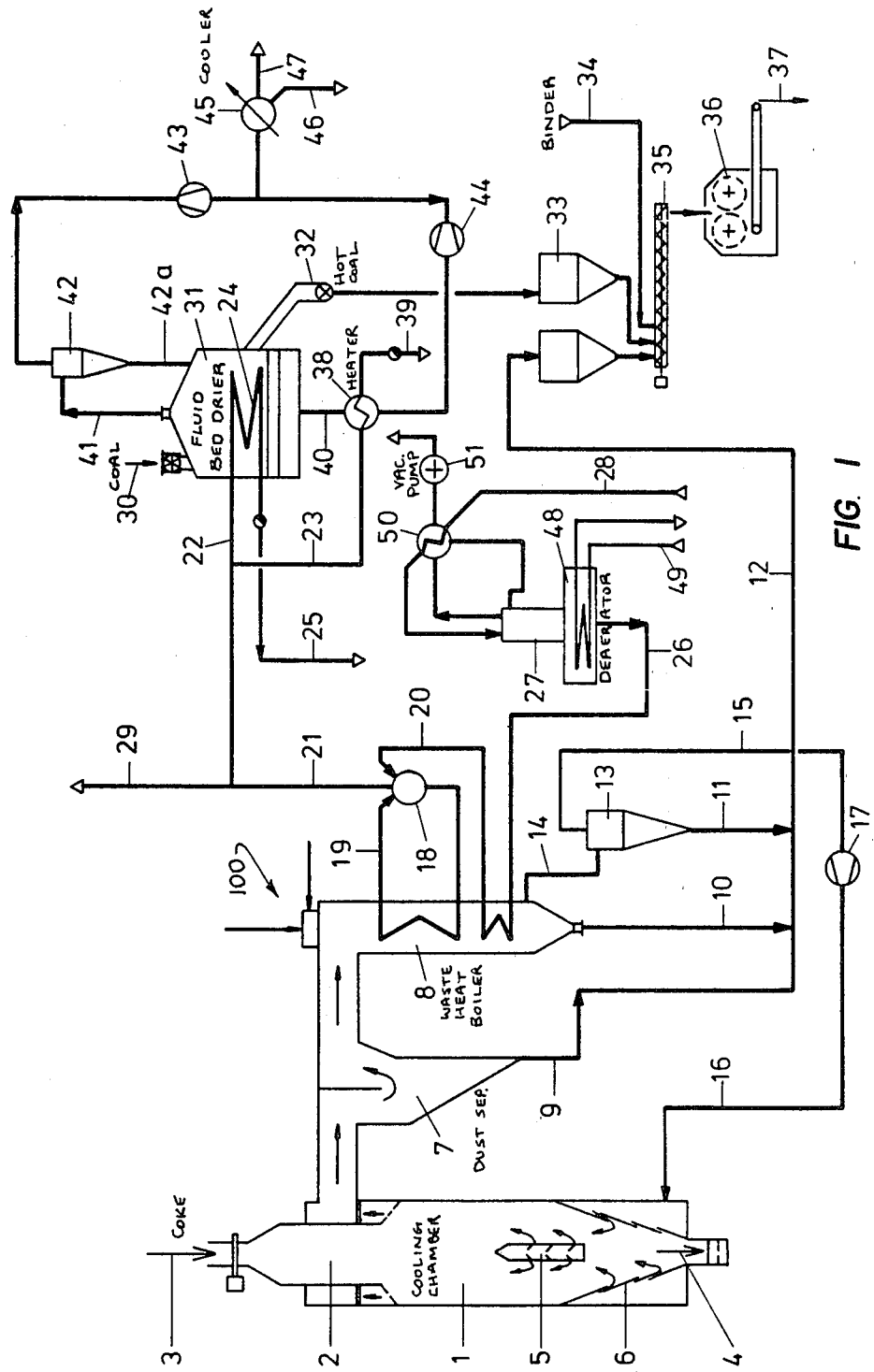
FIG. 1 is a schematic diagram of a coal drying process combined with dry coke cooling, including vacuum deaeration of the boiler feed water and briquetting.

Referring to the drawings, in particular, the invention embodied therein comprises a three-cycle process for drying and preheating coking coal using heat from dry cooled or quenched coke, with the general layout of apparatus for practicing the invention shown in FIG. 1. In FIG. 1, the various components of the apparatus are shown connected to each other and interacting as follows: a cooling chamber 1; an antechamber 2; a coke inlet 3; a coke outlet 4; a cooling gas inlet 5; another cooling gas inlet 6; a dust separation chamber 7; a waste heat boiler 8; fine coke discharges 9, 10, 11 and 12; a cyclone 13; cooling gas return pipes 14, 15 and 16; a cooling gas blower 17; a steam cylinder 18; a steam feeder 19; a feed water feeder 20; a steam pipe 21, a steam pipe 22 to heating coils 24; a steam pipe 23 to heater 38; heating coils 24; a condensate discharge 25; a deaerated boiler feed water 26 to waste heat boiler 8; a deaerator 27; a feed water supply 28 to deaerator 27; a vent 29 for excess steam; a coal feeder 30; a fluid bed drier 31; a hot coal discharge 32; a hot coal bin 33; a binder feeder 34; a mixer 35; a roll press 36; a transfer to the coke oven 37; a heater 38; a condensate discharge 39; an additional line 40 for fluidizing medium; a discharge line 41 for fluidizing medium; a cyclone 42; a dust return pipe 42a; blowers 43 and 44; a cooler 45; a condensate discharge 46; a waste air vent 47; a feed water storage tank 48; a fuel supply 49; a cooler 50; a vacuum pump 51; and a combustor 100 for supplying hot gases to the cooling gas from cooling chamber 1.

Figure 2:
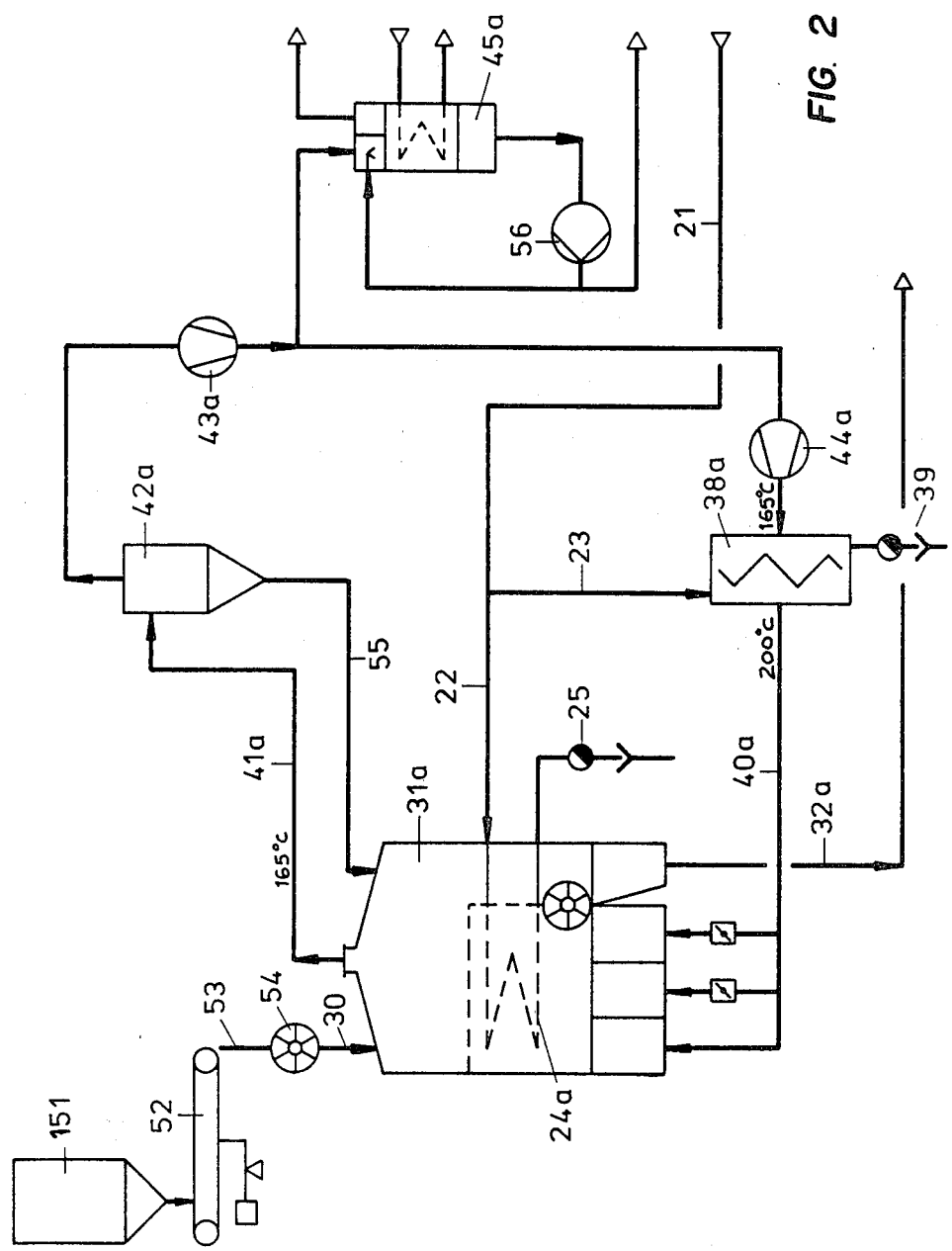
FIG. 2 is a schematic diagram of coal drying in a fluid bed with a steam cycle.

What follows is a description of coal drying in a fluid bed system on the basis of a numerical example and according to the showing of FIG. 2:

Five tons/hour of wet coal are dried in the fluid bed system and heated to 180° C. The coal is withdrawn from coal bin 151 over a conveyor-type weigher 52 and fed continuously through line 53 to fluid bed drier 31a with heating coils 24a. The product is introduced, free-falling, behind bucket wheel 54 through line 30 from the top through an opening in the hood of drier 31a, without the use of a feeding element. The system pressure at the coal inlet into the fluid bed system is ±0 mm WC (water column). Bucket wheel 54 has the function of preventing the entrance of leaking air and the escape of steam under the above described operating conditions.

After drying and heating to 180° C., the coal issues, again free-falling, through the collecting and discharge chute 32a, arranged in the gas box of the fluid bed.

The dust carried along from fluid bed 31a, through pipe 41a and in cyclone 42a at a temperature of 165° C., is returned again into the fluid layer or bed through pipe 55.

The coal is fluidized by steam. The energy required for evaporating the water and for heating the coal is supplied to the product mainly indirectly by heat transfer over heat exchange pipes, and to a lesser extent by cooling the fluidizing medium. The heat exchanger units or coils 24a installed in the fluid bed, are heated with saturated steam of 30 bar.

The fluidizing medium is drawn in by blower 44a, heated to 200° C. in the following heater 38a by means of steam at 30 bar, and fed through pipes 40a to fluid bed drier 31a. In the fluid bed, the medium is evenly distributed by a special blow bottom (not shown). The fluidizing steam swirls the coal layer and is cooled to about 165° C.

The water released during the drying process is collected in the form of steam together with the fluidizing steam in the hood of fluid bed drier 31a and is exhausted by blower 43a over the interposed cyclone 42a.

In the operation with steam as the fluidizing medium, only the water evaporated from the coal together with the leaking air introduced over bucket wheel 54 is withdrawn behind blower 43a as excess waste steam, and cooled in condenser 45a to about 40° C. In order to reduce the exchanger surface to avoid deposits of coal dust on the cooling tubes, condenser 45a is continuously admitted with condensate over pump 56. The steam cycle is fed at about 165° C. to blower 44a, heated in heater 38a to 200° C., and fed through pipe 40a again to fluid bed drier 31a.

Drier 31a, cyclone 42a, heater 38a, and the pipe lines of the entire steam cycle are heat-insulated to keep heat losses low, and to avoid condensation.

This process requires substantially the following operating amounts per hour: steam (at 30 bar, saturated steam) 1350 kg; and cooling water 35 m$^3$. About 80 m$^3$ waste steam and 500 kg waste water per hour, free of harmful substances are obtained.

Figure 3:
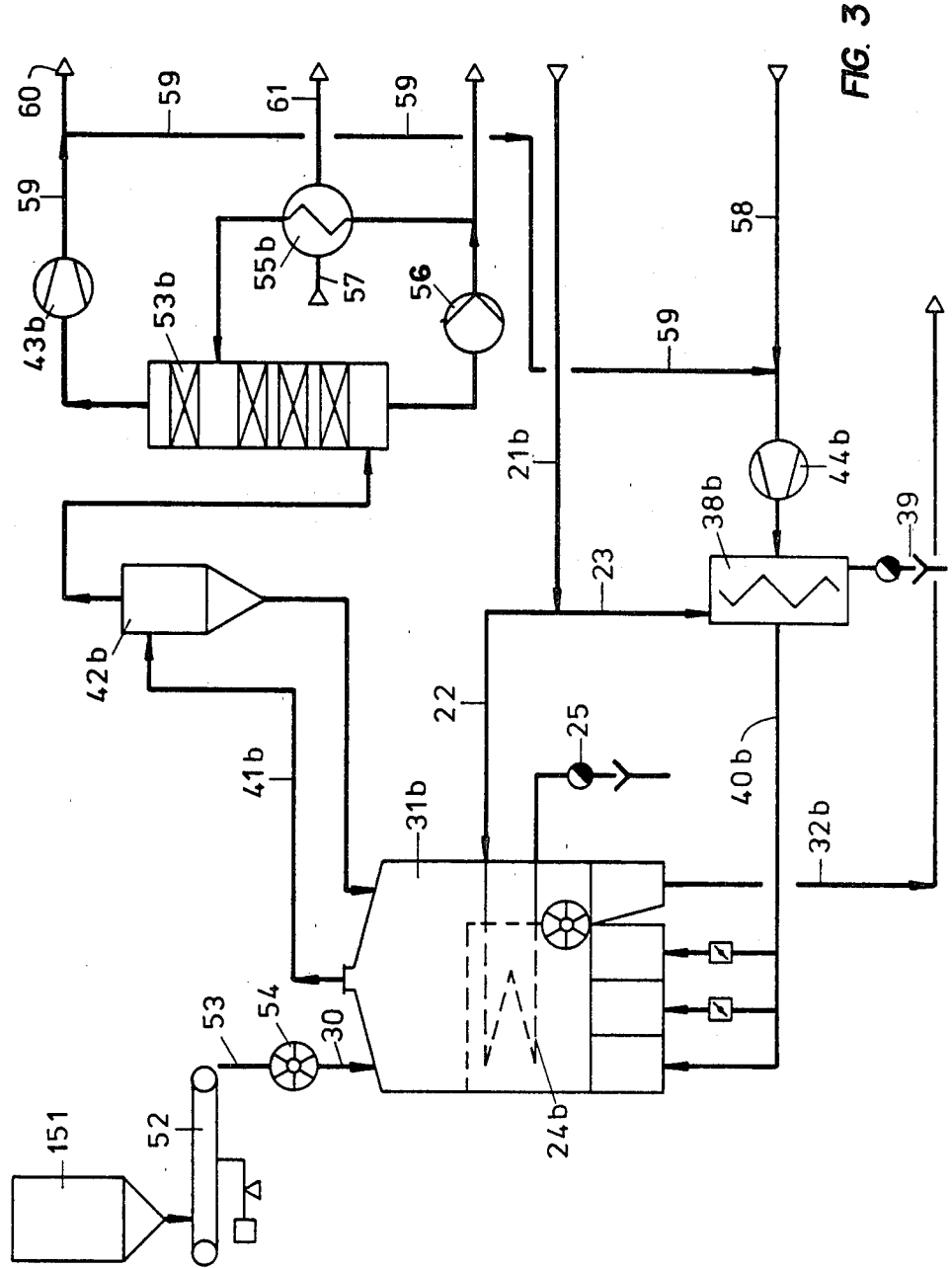
FIG. 3 is a schematic diagram of coal drying in a fluid bed with an inert gas cycle.

Referring now to FIG. 3, what follows is a description of coal drying in a fluid bed system with an inert gas cycle:

The coal is withdrawn from wet coal bin 151 over a conveyor-type weigher 52 and fed continuously through line 53 to fluid bed drier 31b. The product is introduced, free-falling, behind bucket wheel 54 and line 30 from the top through an opening in the hood, without any mechanical feeding element. The system pressure at the coal inlet 30, into the fluid bed system, is ±0 mm WC.

After drying and heating, the coal issues again, in free fall, through the collecting and discharge chute 32b arranged in the gas box of the fluid bed.

The dust carried along from the fluid layer in apparatus 31b through line 41b and deposited in the cyclone 42b, is returned into the fluid layer.

The coal is fluidized by inert gas. The energy required for evaporating the water and heating the coal is supplied to the product mainly indirectly by heat transfer over heat exchanger pipes, and to a lesser extent by cooling the fluidizing medium. The heat exchanger packs 24b installed in the fluid bed driers 31b are heated with saturated steam of 30 bar.

The fluidizing medium is drawn in by blower 44b, heated in the following heater 38b by means of steam of 30 bar, to 200° C., and fed through line 40b to fluid bed drier 31b. In the fluid bed the medium is evenly distributed by a special blow bottom (not shown). The fluidizing medium swirls the coal layer and is cooled to about 147° C.

The water released in the drying process is collected in the form of steam together with the fluidizing gas in the hood of fluid bed drier 31b and is discharged over the interposed cyclone 42b.

The entire amount of inert gas is cooled in condenser 53b arranged behind cyclone 42b to about 37° C. The water evaporated from the coal in the fluid bed is discharged over pump 56a as waste water. Condenser 53b is designed as a direct cooler, the cooling of the recycled water being effected in cooler 55b. Due to the small amount of leaking air introduced over the bucket wheel 54, the O$_2$-content in the recycle gas would increase in the course of time. In order not to exceed a certain O$_2$-content in the inert gas cycle, a small amount of inert gas is continuously supplied to the recycled gas, over blower 44b and lines 58, 59. This amount of inert gas plus the leaking air are eliminated from the process as excess gas behind blower 43b and line 59, 60. The amount of inert gas required for the fluidization is fed to blower 44b with a temperature of about 37° C., heated in heater 38b to 200° C., and returned to fluid bed drier 31b.

Drier 31b, cyclone 42b, heater 38b, as well as the pipe lines of the entire inert gas cycle are heat-insulated to keep the heat losses low.

In this process, the following operating amounts are essentially required per hour:

steam (at 30 bar, saturated steam) through 21b, 1850 kg; cooling water through line 57,61, 60 m$^3$; inert gas through lines 58, 59, 50—100 m$^3$n.

The following amounts were given off by hour:

waste gas and leaking air 200 m$^3_n$;

condensate free of harmful substances, 500 kg.

While specific embodiments of the invention have been shown and described in detail to illustrate the application of the principles of the invention, it will be understood that the invention may be embodied otherwise without departing from such principles.

What is claimed is:

1. A process for drying and preheating coking coal using heat from coke to be cooled comprising:
    passing a cooling gas over hot coke in a coke cooling chamber to cool the coke and heat the cooling gas;
    recycling the heated cooling gas through a waste heat boiler and back to the coke cooling chamber to form a first closed cycle;

supplying water to the waste heat boiler to form steam by heating the water indirectly with the heated cooling gas;

feeding steam formed in the waste heat boiler to a fluidized bed of wet coal to indirectly preheat and dry the wet coal in a second cycle;

fluidizing the wet coal using a fluidizing gas supplied to the bed indirectly of the steam fed to the bed for preheating and drying the wet coal, the fluidizing gas converting water in the wet coal into steam;

feeding the fluidizing gas plus steam converted by the fluidizing gas from the bed and into a further heater;

condensing at least some of the steam converted by the fluidizing gas;

returning the fluidizing gas less the at least some condensed steam to the bed in a third closed cycle;

indirectly heating the returning fluidizing gas using steam from the waste heat boiler in the further heater before it returns to the bed;

said three cycles for transferring heat from the coke to be cooled, to the wet coal to be preheated and dried being conducted in a temperature range of between 90° and 250° C., so that no desulfurization of the coal takes place.

2. A process according to claim 1, wherein the fluidizing gas comprises steam supplied to the further heater and the fluidized bed, water removed from the wet coal being discharged in the form of the condensed steam.

3. A process according to claim 1, wherein the fluidizing gas comprises an inert gas used in the third closed cycle for fluidizing the wet coal, the steam converted from water by the inert fluidizing gas being condensed and removed from the third closed cycle.

4. A process according to claim 1, including supplying the waste heat boiler with de-aerated boiler feed water at about 50° C., from a vacuum de-aerator.

5. A process according to claim 1, wherein coke dust carried by the cooling gas in the first closed cycle is removed from the first closed cycle, and including combining and mixing the removed coke dust with preheated and dried coal from the fluidized bed and a binder, and briquetting the mixture.

6. A process according to claim 1, including supplying hot combustion gases to the cooling gas of the first closed cycle.

* * * * *